United States Patent
Anhut et al.

(10) Patent No.: US 12,001,006 B2
(45) Date of Patent: Jun. 4, 2024

(54) DEVICE AND METHOD FOR RAPID THREE-DIMENSIONAL CAPTURE OF IMAGE DATA

(71) Applicant: CARL ZEISS MICROSCOPY GMBH, Jena (DE)

(72) Inventors: Tiemo Anhut, Jena (DE); Daniel Schwedt, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 311 days.

(21) Appl. No.: 17/453,079

(22) Filed: Nov. 1, 2021

(65) Prior Publication Data
US 2022/0137388 A1    May 5, 2022

(30) Foreign Application Priority Data

Nov. 1, 2020    (DE) ...................... 10 2020 213 715.3

(51) Int. Cl.
*G02B 21/36*    (2006.01)
*G02B 3/00*    (2006.01)
(Continued)

(52) U.S. Cl.
CPC ......... *G02B 21/365* (2013.01); *G02B 3/0037* (2013.01); *G02B 21/02* (2013.01);
(Continued)

(58) Field of Classification Search
CPC ............... G02B 21/008; G02B 21/006; G02B 21/0052; G02B 21/0048; G02B 21/0036;
(Continued)

(56) References Cited

U.S. PATENT DOCUMENTS 6,639,201 B2 * 10/2003 Almogy ............. G01N 21/8806
250/208.1
6,653,613 B1    11/2003 Bucourt et al.
(Continued)

FOREIGN PATENT DOCUMENTS

CN    110346340 A    10/2019

OTHER PUBLICATIONS

Broxton, et al., "Wave optics theory and 3-D deconvolution for the light field microscope", Optics Express, vol. 21, No. 21 (https://graphics.stanford.edu/papers/lfdeconvolution/broxton_oe-21-21-25418.pdf), 2013, pp. 25418-25439.
(Continued)

*Primary Examiner* — John R Lee
(74) *Attorney, Agent, or Firm* — Brake Hughes Bellermann LLP

(57) ABSTRACT

A device includes a detection path, along which detection radiation is guided, and a means for splitting the detection radiation between first and second detection paths. A detector has detector elements in each detection path. A microlens array is disposed upstream of each detector in a pupil. The first and second detectors have a substantially identical spatial resolution. The detector elements of the first detector are arranged line by line in a first line direction, while the detector elements of the second detector are arranged line by line in a second line direction. The first and second detectors are arranged relative to the image to be captured such that the first and second line directions are inclined relative to one another. A readout unit for reading out the image data of the detectors is configured for selectively reading those detector elements arranged line by line which form an image line.

17 Claims, 8 Drawing Sheets

(51) Int. Cl.
G02B 21/02 (2006.01)
G02B 21/06 (2006.01)
G02B 26/10 (2006.01)
G02B 27/10 (2006.01)
H04N 5/345 (2011.01)
H04N 5/378 (2011.01)
H04N 13/239 (2018.01)
H04N 13/254 (2018.01)
H04N 25/443 (2023.01)
H04N 25/75 (2023.01)
G06N 3/02 (2006.01)

(52) U.S. Cl.
CPC ............. *G02B 21/06* (2013.01); *G02B 26/10* (2013.01); *G02B 27/106* (2013.01); *H04N 13/239* (2018.05); *H04N 13/254* (2018.05); *H04N 25/443* (2023.01); *H04N 25/75* (2023.01); *G06N 3/02* (2013.01)

(58) Field of Classification Search
CPC .. G02B 21/0032; G02B 27/10; G02B 27/106; G02B 26/10; G02B 3/0068; G02B 3/0043; G02B 3/0056; G02B 3/0037; G02B 21/02; G02B 21/06; G02B 21/361; G02B 21/367; G02B 21/365; G06N 3/0464; G06N 3/04; G06N 3/02; H04N 25/40; H04N 25/41; H04N 25/44; H04N 25/441; H04N 25/443; H04N 25/71; H04N 25/75; H04N 13/282; H04N 13/243; H04N 13/218; H04N 13/207; H04N 13/20; H04N 13/204; H04N 13/239; H04N 13/254
See application file for complete search history.

(56) References Cited

U.S. PATENT DOCUMENTS

| | | | | |
|---|---|---|---|---|
| 8,670,178 | B2* | 3/2014 | Cooper | G02B 21/0032 |
| | | | | 359/368 |
| 2004/0061042 | A1* | 4/2004 | Almogy | G01N 21/9501 |
| | | | | 250/208.1 |
| 2015/0362713 | A1 | 12/2015 | Betzig et al. | |
| 2018/0177401 | A1* | 6/2018 | Yang | G01N 21/6458 |
| 2022/0137388 | A1* | 5/2022 | Anhut | G02B 26/10 |
| | | | | 348/43 |
| 2023/0070373 | A1* | 3/2023 | Schwedt | G02B 21/365 |

OTHER PUBLICATIONS

Cong, et al., "Rapid whole brain imaging of neural activity in freely behaving larval zebrafish (*Danio rerio*)", eLife, Neuroscience, Tools and Resources (https://elifesciences.org/articles/28158), Sep. 20, 2017, 20 pages.

Scrofani, et al., "FIMic: design for ultimate 3D-integral microscopy of in-vivo biological samples", Biomedical Optics Express, vol. 9, No. 1, Jan. 2018, pp. 335-346.

Wang, et al., "Deep learning enables cross-modality super-resolution in fluorescence microscopy", Nature Methods. vol. 16(1); (https://www.ncbi.nlm.nih.gov/pmc/articles/PMC7276094/), Jan. 2019, pp. 103-110.

Weisenburger, et al., "A Guide to Emerging Technologies for Large-Scale and Whole-Brain Optical Imaging of Neuronal Activity", Annual Reviews Neuroscience, vol. 41 (https://doi.org/10.1146/annurev-neuro-072116-031458), Apr. 25, 2018, pp. 431-452.

Zhang, et al., "A Comparable Study of CNN-Based Single Image Super-Resolution for Space-Based Imaging Sensors", Sensors, (https://www.mdpi.com/1424-8220/19/14/3234), 19(14), 3234, 2019, 18 pages.

* cited by examiner

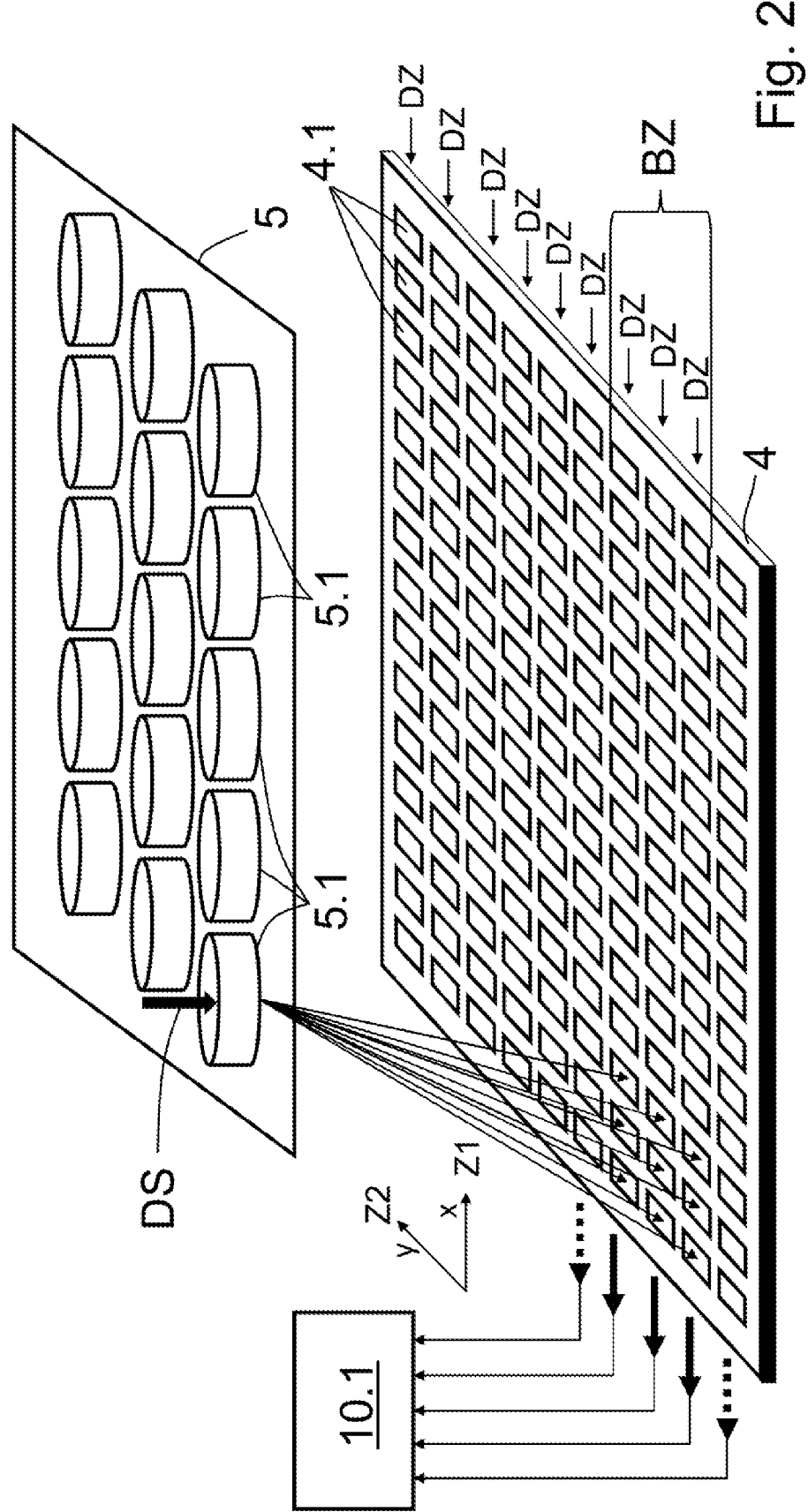

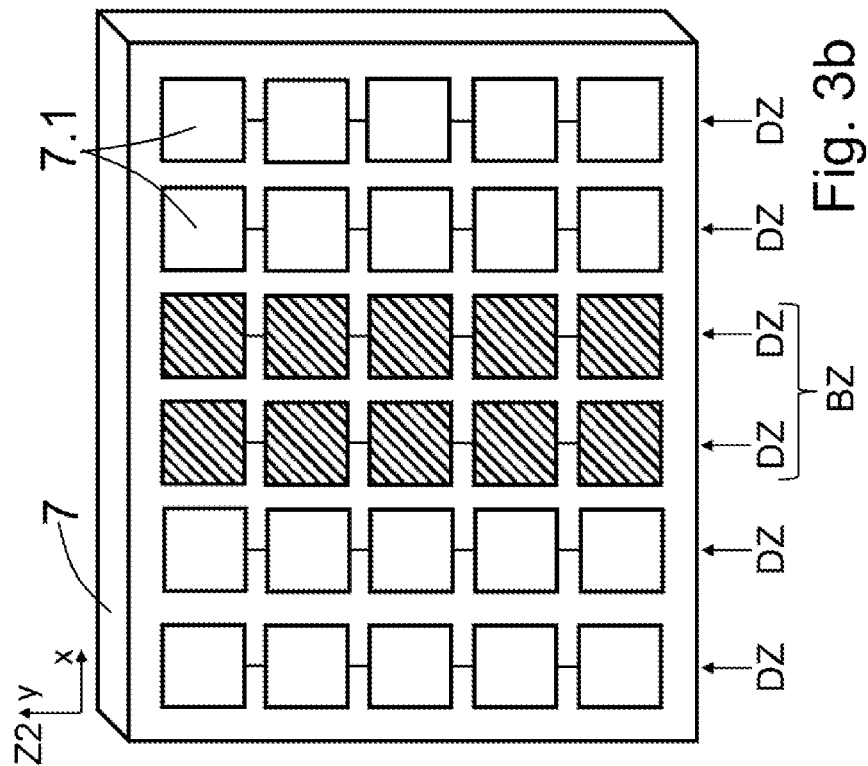
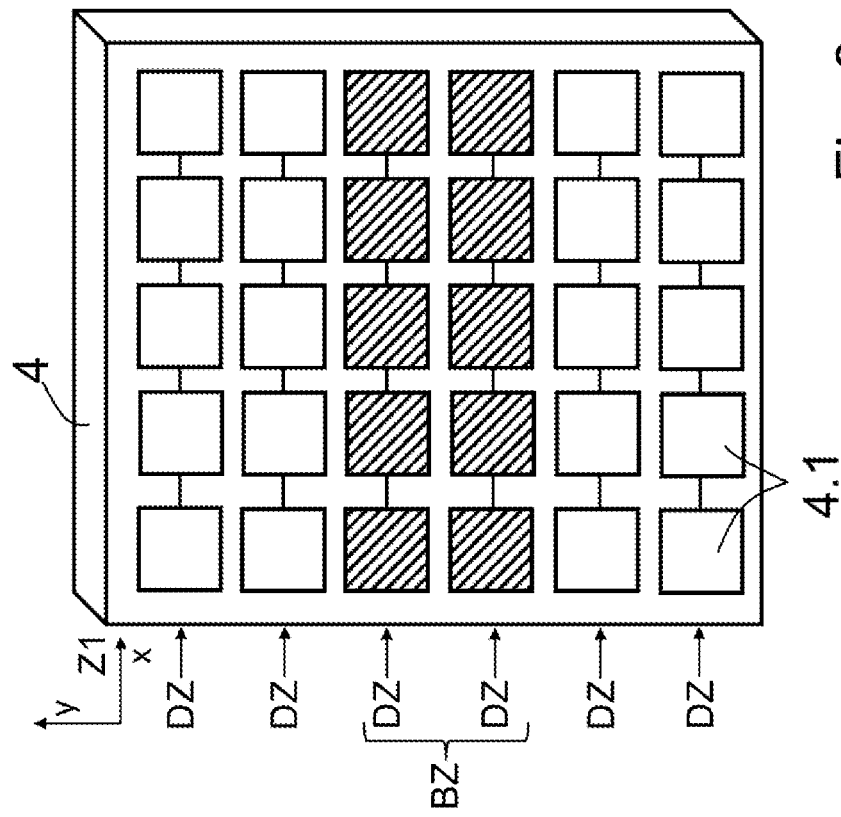

DEVICE AND METHOD FOR RAPID THREE-DIMENSIONAL CAPTURE OF IMAGE DATA

CROSS REFERENCE TO RELATED APPLICATIONS

This application claims priority to German Application No. 102020213715.3, filed Nov. 1, 2020, the disclosure of which is incorporated herein by reference in its entirety.

TECHNICAL FIELD

The invention relates to a device and a method for rapid three-dimensional capture of image data.

SUMMARY

Modern microscopy is focusing more and more on the rapid capture of three-dimensional sample volumes. One major application here is the measurement of neural signals in networks of nerve cells. These networks spread across hundreds or thousands of micrometers in the brain. In order then to be able to understand essential capabilities of the brain, reactions of these networks or of large portions thereof are intended to be captured as completely as possible with high temporal resolution.

Since this concerns not just an understanding of the morphological structure, but rather functional processes, these methods are also brought together under the keywords of functional imaging.

A number of different methods that can be used to approximate functional imaging are known in the field of microscopy. Methodical approaches such as a rapid 2D recording, for example, which is then scanned axially, are generally too slow for the field of application outlined above. Methods oriented purely toward an algorithmic evaluation (computational imaging) are generally susceptible to artifacts.

Confocal scanning methods with a low degree of parallelization have the disadvantage that they operate relatively slowly and time-sequentially. An increase in speed is often accompanied by an increase in the light power in the sample, wherein a higher light power can saturate fluorescent markers used and damage the sample. A further point-scanning method is multi-photon microscopy. In that case, too, the degree of parallelization is low.

A higher parallelization is possible by means of spinning disk microscopy, for example. In that case, a greater number of scanning beams are guided simultaneously over a sample and the detection radiations brought about in each case are captured through so-called pinholes present in a rotating disk. This confocal method allows for example a few hundred focal volumes to be scanned in parallel.

Methods and arrangements which make use of so-called light sheet illumination likewise have a higher degree of parallelization. To that end, a static or dynamic light sheet is generated and directed into the sample. On account of the very small thickness of the light sheet transversely with respect to the areal extent thereof (light sheet thickness), detection radiation, in particular fluorescent radiation, is brought about only in a plane currently being illuminated.

In order to additionally also obtain spatial information of the sample by way of only one recording, a detection according to light field technology can be employed. The latter allows a rapid data capture within, from the standpoint of microscopy, larger volumes, and also a good depth resolution. The disadvantages can be seen in the lack of a possibility of optical sectioning and strong background radiation.

The capture of a larger volume with simultaneously improved resolution can be achieved by the use of a microlens array upstream of the detector. To that end, the publication Cong et al. (Cong, L. et al. 2017; eLife, 6:e28158), proposes a microlens array with microlenses of different focal lengths arranged therein. What is disadvantageous, however, is that only a part of the aperture is used by each of the microlens groups.

Techniques disclosed herein are based on the object of proposing a further possibility that enables three-dimensional regions of a sample to be imaged with a high temporal resolution.

The object is achieved by means of a device for capturing image data. Said device comprises a detection beam path, along which detection radiation, for example, of a microscope, is guided or is guidable. In order to split the detection radiation between a first detection path and a second detection path, a means for splitting the detection radiation is present. A first detector is arranged in an image plane in the first detection path and a second detector is arranged in an image plane in the second detection path. A microlens array is disposed upstream of both detectors in a plane that is conjugate with respect to the system pupil.

The first detector has detector elements arranged in detector lines in a first line direction in the image plane. The second detector likewise has detector elements arranged in detector lines in a second line direction in the image plane. Each microlens of the relevant microlens array is in each case optically assigned a number of detector elements. A microlens thus images the detection radiation captured by it onto the assigned detector elements (also referred to as image elements or pixels) in the form of an individual image or sub-image. As a result, an image line of the image to be captured is formed by those detector elements (pixels) of at least one detector line of the first and respectively of the second detector which are optically assigned to the microlenses of the respective microlens array and capture the relevant sub-images.

According to an implementation, a readout unit for reading out and optionally for storing the image data of the detectors is present. The readout unit is configured for selectively reading those detector elements arranged line by line which form an image line.

Implementations can involve the capture and optional evaluation of only selected image lines. In this case, a very rapid image capture and image processing are made possible, while losses in spatial resolution remain low. The selective reading can concern entire detector lines if the technical construction of the relevant detector only allows this possibility. If detectors are used whose detector elements can be selectively read totally or largely independently of one another, it is also possible to read only those detector elements of one or more detector lines which form an image line.

The principle can be explained as follows: Microlenses are optical lenses and have a diameter of from a few micrometers to a few millimeters. If an object (sample) is imaged using a detector with an upstream microlens array in such a way that the system pupil, which is generally situated in a conjugate plane with respect to the exit pupil of an objective ("back focal plane"), is imaged onto the microlens array, then each partial image downstream of each of these microlenses supplies a view of the object at a certain angle. A three-dimensional volume (voxel) of the object can be reconstructed from the partial images of all the microlenses. In order to achieve higher capture speeds, only a small number of lines of the detector (detector lines) are read. It is advantageous for a whole number of image lines to be read, wherein an image line is defined by those detector lines which belong to those images (individual images, sub-images) on the detector which are generated by optically assigned microlenses, for example, by a line of microlenses, and accordingly constitutes a line of (sub-)images. Detectors whose detector elements are arranged in detector lines are used for the image capture. In most customary detectors, the detector elements are read in each case line by line for the purpose of obtaining data. The reading of the detector lines can therefore also be referred to as a rapid readout direction, while the direction transverse with respect to the individual detector lines can be regarded as a slow readout direction.

In one embodiment, the first detector and the second detector are arranged relative to the image to be captured such that the first line direction and the second line direction are inclined in relation to one another. The inclination of the first line direction and of the second line direction with respect to one another is greater than zero degrees and less than 180°, that is to say that the line directions are different. As will also be explained further below, an inclination in a range of 60° to 120°, in particular of 90°, is advantageous.

In one possible embodiment, the spatial resolution and the temporal resolution of the first detector and of the second detector are substantially identical. The detectors are additionally configured for capturing the same image of a sample. With such an embodiment, the image data of the detectors can be computed with one another with low complexity. The image is advantageously captured substantially simultaneously in order to enable a rapid provision of the resulting 3-D images and in order that advantageously low main memory capacities have to be kept available.

In one advantageous embodiment, only the lines of the detector elements which are optically assigned to the microlenses of the microlens array, said microlenses being arranged along a line, for example, that is to say which capture the partial images of the relevant microlenses, are selectively read for each detector. It is also possible for only selected image lines to be selectively read. To that end, it is not necessary for entire detector lines to be read.

If only one image line of a detector is read, that is to say the detector lines representing an image line or, insofar as is technically possible, the corresponding sections of the relevant detector lines, the capture speed increases by comparison with a capture of all the detector lines. This circumstance is advantageously utilized within the meaning. However, the object is imaged at different angles in only one direction. Owing to the capture of partial images of a line of microlenses, those items of information which are imaged in a direction orthogonally with respect to the line of microlenses are lost. In the case of a series of samples, it can happen that structures are entirely or partly covered and viewing is effected only in a direction around the obstacle covering the structure. In addition, the number of reconstructible planes in the z-direction approximately corresponds to the number of microlenses.

This disadvantage can be reduced by the implementation of a further consideration in which the first detector and the second detector, as indicated, are arranged in relation to the image to be captured such that the respective detector lines, that is to say the line directions, are inclined in relation to one another. The rapid readout directions thus run in an inclined manner, for example orthogonally, with respect to one another.

By means of the device, the object can be viewed and imaged in parallactic fashion in two directions. A possible computation of the image data of both detectors is advantageously effected as though the image data had been captured by only one detector.

The microlenses that are optically assigned to the detector lines representing an image line can be arranged along a virtual line in one embodiment of the microlens arrays. An arrangement along a line should be understood to mean that, for example, the microlenses arranged along a line are directly adjacent to one another. The virtual line runs substantially through the center points of the microlenses. The number of microlenses arranged in this way is at least five, advantageously at least ten. If, in a further embodiment, the microlenses are arranged for example in a so-called honeycomb pattern, then some of the microlenses can be arranged along a line at least in specific directions of the microlens array.

Alternatively, microlenses that are arranged alternately laterally offset in relation to one another (e.g., in specific directions of a honeycomb pattern) can be configured with regard to their focal lengths and imaging directions, for example, with regard to their respective optical axes, such that only one or a plurality of specific detector lines are illuminated through them.

In a possible further embodiment of the device, a common microlens array is disposed upstream of the two detectors in a pupil. Said common microlens array technically fulfills the tasks of the first and second microlens arrays. In this embodiment, the detection radiation is split between the first and second detection paths only downstream of the common microlens array. Such an embodiment allows a simplified design, but at the same time reduces the variation possibilities with regard to the configuration of the common microlens array.

A simultaneous capture of the image is supported for example by both detection paths having an identical optical path length.

Advantageously, an evaluation unit, for example, a computer or FPGA (field programmable gate array), for evaluating the captured image data of the first and second detectors is present, wherein the evaluation unit is configured in such a way that the selectively read-out image data of both detectors are evaluated and a three-dimensionally resolved resulting image is generated from these evaluated image data. Additionally, or alternatively, a computer or an FPGA configured for loading ("streaming") and precomputing the captured image data can be present. Assuming that the detectors provide for example 150 images per second with an exemplary number of pixels of 26,000,000 with a data depth of 12 bits, data rates of 2×5 Gbytes/second can be achieved, for example.

An image, in particular, a three-dimensionally resolved resulting image, is understood to mean, in particular, a data set that represents a (digital) three-dimensional representation of the sample. Said data set can be visualized, for example, as a two- or three-dimensional graphic.

The first and second detectors of the device are, for example, two-dimensional detectors having a number of detector elements arranged in lines. Since a very high sensitivity (low noise) is required, EMCCD or sCMOS sensors are suitable for example as detectors. SPAD detectors, for example, SPAD arrays such as CMOS-SPAD array sensors, for example, will also gain in importance in the future.

In a simple case, the detectors used can be structurally identical. In further embodiments, it is also possible for different types of detectors to be used. It is of importance here for the latter to be substantially identical with regard to their spatial and temporal resolution.

In a further embodiment, the detectors differ structurally with regard to their spatial resolution. A substantially identical spatial resolution can be achieved by a corresponding number of detector elements of the detector having the higher resolution being computed with one another (so-called binning) in order to correspond to the spatial resolution of the detector having the lower resolution. The evaluation unit is configured accordingly in this case. Such an embodiment of the device enables a three-dimensional image capture according to a method that is the subject of a further application.

In order to support a computation of the image data captured by the respective detectors, the first detector and the second detector are advantageously aligned with respect to one another in such a way that an assignment of the image data to one another is possible in a simple manner. The purpose of a combination of the captured image data is also served if first and second detectors are synchronized with one another with regard to their respective capture intervals.

The splitting of the detection radiation between the first and respectively the second detection path can be effected in various ways. The means for splitting the detection radiation can be, for example, a beam splitter, in particular, a neutral splitter, a dichroic beam splitter, a polarization splitter, a diffractive optical light sheet, a spatially structured beam splitter or a switchable mirror.

If a dichroic beam splitter is used, the device according to the implementations disclosed herein and the method according to the implementations disclosed herein can be used for a two-colored imaging of the observed volume. This presupposes that the image generation does not require the highest possible readout rate and corresponding capacities are thus available for the capture of the image data.

The detection radiation can be transferred at an intermediate image plane as interface between microscope and device. The detection radiation is converted from an intermediate image plane into an optical pupil by means of Fourier transformation. The device can be part of a microscope or can be connected to such.

The requirements to be satisfied for example for the examination of processes in the brain of small organisms, such as a fruit fly, for example, shall be elucidated on the basis of an example. What is desired here is an observation of approximately 10 000 neurons. In this case, the optical resolution should be at least of the magnitude of the perikaryon of the neurons at approximately 5 μm. If the volume of the brain is converted to a cube, then a volume of 400×400×400 μm should be able to be observed. Methods suitable for satisfying these requirements are known inter alia as the plenoptic principle, light field microscopy or integral imaging and are employed in microscopy.

The literature discloses various methods for imaging three-dimensional volumes using a two-dimensional sensor. In this regard, a distinction is drawn between two variants, in principle, which have in common the fact that a microlens array (MLA) is mounted upstream of a detector. In light field microscopy that has frequently been used hitherto, the MLA is often positioned in the nominal image plane. The detector elements or pixels situated in an image plane downstream of the respective microlens then capture the respective item of angle information of the light emitted by the sample (object) (e.g., Broxton et al. 2013; OPTICS EXPRESS 21: 25418-39).

An advantageous arrangement for microscopy is afforded, however, if the pupil plane of the arrangement is optically divided (Fourier domain light field microscopy). For this purpose, a microlens array is arranged in such a way that the detector is situated in a plane (image plane) that is conjugate with respect to the sample plane. In this case, the microlenses of the microlens array are implemented in a plane that is optically conjugate with respect to the objective pupil. Implementations described herein can relate to this variant of light field microscopy.

The microlens arrays of the device need not be identical with one another. Different microlens arrays can be selected, for example, in order to achieve a good adaptation to the geometry of a detector, or to the chip thereof, or in order to mutually balance the spatial resolution in relation to the detection rate, etc.

Currently available detectors allow a parallelized recording with a large number of pixels into the range of a few megapixels. In the following general descriptions, detectors from PCO AG (Kehlheim, Germany) are emphasized merely by way of example.

For example, the camera pco.edge 26 MP allows the recording of 5120×5120 pixels, wherein each pixel (detector element) has a size of 2.5 μm×2.5 μm. This results in a sensitive area of the detector of 12.8 mm×12.8 mm. The sensor diagonal thus has a length of 18.1 mm. According to the data sheet (as at July 2020), the image recording rate of the camera is 7.1 frames per second (fps), wherein the pixel data rate is specified as 267 Mpixels/s.

It may be expected in the future that the frame rates of these systems are likely to become even higher. Ultimately, however, the maximum readout rates of the full camera sensor are limited by the data rate that can be transmitted and processed. However, for cameras of this type it always holds true that smaller regions on the camera that are limited with regard to the number of detector lines to be read can be read very much more rapidly than would be required for the entire camera chip. In the case where only a few lines are read, for example, a speed factor corresponding to the ratio of the lines read vis-à-vis the total number of lines is approximately obtained. In other words, if e.g., only ⅒ of the lines are read, then the camera becomes faster approximately by a factor of 10. That is also understandable since ultimately the data rate is a limiting factor and, as a result, fewer pixels are able to be read correspondingly faster.

In the case of a reduction of the number of pixels read of 5120×64 pixels, for example, over 500 volumes per second are achieved. The time difference between two full volumes captured is then just 2 ms. These speeds are important to be able to capture the reactions of neural networks in their entirety both spatially and temporally. In this regard, for example, the average firing rate of a neuron of the fruit fly is specified as about 40 Hz and the size of a neuron is specified as about 2 to 5 μm (Weisenburger, S. & Vaziri, A., 2018; Annual Review of Neuroscience 41: 431-452). Of course, depending on the measurement task and the data rate technically possible, detector lines illuminated by a plurality of lines of microlenses and thus for example multiples of the exemplary number of pixels 64 can also be read selectively.

If implementations of the device described herein form a part of a microscope, then the latter, in one possible embodiment, can be configured for illumination with a scanned light sheet instead of a wide field-like illumination of the sample. This type of illumination is advantageous for various reasons. For example, light from sample planes that are not of interest is discriminated very well, the axial resolution can be increased and at the same time a low energy input into the sample and thus little photodamage are attained.

The following considerations can be undertaken in order for example to select the detectors used in a device according to the invention.

For the lateral resolution in Fourier light field microscopy, the following holds true (Scrofani, G. et al., 2018; BIOMEDICAL OPTICS EXPRESS 9: 335-346).

$$\delta x \le \max\left\{\frac{\lambda N}{2NA_{MO}}; 2ps\frac{f_{TL}f_{MO}}{f_{MLA}f_{pup}}\right\}. \quad (1)$$

In this case, is the wavelength of the light, N is the number of sub-apertures, NAMO is the numerical aperture of the microscope objective, ps is the pixel size and f are focal lengths of the tube lens (TL), of the microscope objective (MO), of the microlens array (MLA) and of the lens for pupil transformation (pup).

The first expression describes the wave-optical resolution under the assumption that the point spread function at the detector is sampled in accordance with the Nyquist criterion. The second expression is limiting if sampling is no longer effected according to the Nyquist criterion. The resolution is then limited by the size of the pixels imaged into the sample.

Since a better resolution is not obtained if the requirements of the Nyquist criterion are significantly exceeded, there is no need to effect sampling with more pixels than necessary. The ratios of the focal lengths, numbers of pixels and microlenses are therefore advantageously chosen such that both expressions above are approximately equal.

The size of the imaged intermediate image (ZBE), which functions for example as a transfer location of the microscope, results in accordance with equation (2):

$$ZBE = \#\, px\, ps\frac{f_{pup}}{f_{MLA}}. \quad (2)$$

In this case, #px denotes the number of pixels. An illumination, for example with a light sheet, can be effected by means of an objective that serves as illumination objective and as detection objective. This embodiment allows a compact design. In a further embodiment, the illumination can for example be radiated in laterally and thus be independent of the detection objective. Moreover, it can be advantageous if means for setting a temporally pulsed illumination in the sense of a stroboscopic illumination in the milliseconds range are present in order to stimulate a temporal variation of the fluorescence signals.

In a further embodiment, it is possible to combine the capture of image data according to the principle of widefield illumination with laser scanning microscopy. To that end, in a further embodiment, a two-dimensional detector (2D detector) known from the prior art without an MLA disposed upstream can be present. The further detector is present in addition to the first detector and the second detector. In this case, a resulting image is generated from the image data of the detectors with upstream MLA and the image data of the 2D detector.

In a further embodiment, it is also possible for a scanning device to be situated in the illumination beam path, by means of which scanning device an illumination light spot can be guided over a sample to be imaged. A current alignment of the scanning device permits an ambiguous assignment of a position of the illumination light spot, for example, in a plane (X-Y-plane) extending orthogonally to the optical axis of an illumination objective. A current position of the focus position of a detection objective (Z-position) is likewise captured. In such an embodiment, the light source of a laser scanning microscope (LSM) can be used for the provision of the illumination radiation. Thus, in one possible embodiment, an LSM is combined with a light field microscope (LFM), for example, both are situated on a common stand, and the image data that have a different spatial and/or temporal resolution and are captured by way of different functionings of the microscopes are computed to form a three-dimensional resulting image. The illumination radiation of the LSM can be used for both microscopes (LSM and LFM). If necessary, switching alternately back and forth between the detection paths is effected. Optionally, a detection radiation can also be split proportionally between the detection paths. Both the capture of the associated location of captured image data and an item of information of an associated Z-position of the relevant image data allow the generation of a three-dimensional image data set by means of the first and second detectors of such an embodiment of the device. As an alternative to a scanning device, a relative movement between illumination light spot and sample can be effected by means of a controlled adjustment, for example, a motorized sample stage.

The device described herein can, in particular, be combined with a microscope or be a component of a microscope. A microscope comprising a device as described herein can be used in diverse ways and allows, in particular, a sample volume to be imaged three-dimensionally with both high spatial resolution and high temporal resolution. By way of example, a microscope comprising a device described herein and having a first mode of functioning can be combined with some other microscope having a second mode of functioning. In this regard, for example, a light field microscope can be combined with a laser scanning microscope technically as mentioned such that for example the light source of the laser scanning microscope is used for both modes of functioning.

The microscope can have, in an illumination beam path, a light source, an objective functioning as an illumination objective, and a device for generating a light sheet, wherein the light sheet is generated or can be generated in a sample space on the object side in front of the objective.

In one possible embodiment, the light sheet, with the aim of selective volume illumination, is configured as a rather thick light sheet which, in terms of its thickness, corresponds approximately to the depth of field of the light field detection [approximately (NAMO/N)^2] or can be even thicker.

In a further possible embodiment, the light source can be configured for providing pulsed illumination light. In this regard, pulses having pulse durations in the picoseconds or femtoseconds range can be generated and provided. An illumination of this type can be used for nonlinear fluorescence excitation. Furthermore, a capture of the fluorescence lifetimes is thus possible using a corresponding sensor. By way of example, a pulsed laser is used as light source. One of the detectors can be a SPAD array (Single Photon Avalanche Diode Array). These detectors can be equipped with highly accurate time-to-digital converters (TDC), thereby enabling the temporally resolved photon absorption events to be captured pixel by pixel.

The device for generating a light sheet in a light sheet plane can be, for example, a cylindrical optical unit, a scanning device or a combination of both. Both embodiments can be designed to generate a light sheet that is inclined relative to the optical axis of the illumination objective in a correspondingly obliquely extending light sheet plane. To that end, an illumination light beam of the light source that is shaped by the effect of the cylindrical optical unit and/or respectively an illumination light beam of the light source that is focused by means of the scanning device can be directed into an entrance location in an objective pupil (also referred to as entrance pupil hereinafter) of the objective, said entrance location lying away from the optical axis of the objective. Such an embodiment makes it possible to use a common objective for the illumination and the detection. In alternative embodiments, an illumination objective and a detection objective can be arranged.

In order to adjust a thickness of the generated light sheet transversely with respect to the light sheet plane, adjustable optical means, for example, a zoom optical unit and/or a stopping-down device, can be present in the illumination beam path. In this case, the thickness can be adjusted manually or automatically, for example by a measurement task that is to be carried out being chosen and the thickness of the light sheet being adapted accordingly. Additionally or alternatively, a control loop can influence the thickness of the light sheet if, for example, predefined quality parameters of the captured image data are not achieved. Such quality parameters are for example a predetermined signal-to-noise ratio (SNR) or a signal-to-background ratio (SBR).

In an implementation, a method is disclosed for capturing image data in which detection radiation, in particular, of a microscope, is split between a first detection path and a second detection path and, besides an item of location information of the origin of the detection radiation, a plurality of items of angle information of the detection radiation are also captured in each of the detection paths in an image plane. The image data are thus captured with the use of light field technology.

In an implementation, in the first detection path and in the second detection path image data of the same image are captured with a substantially identical spatial and temporal resolution. The image data represent selected image elements, of which a number are captured along a line in a first image direction in the first detection path and a number are captured along a line in a second image direction in the second detection path. For this purpose, the corresponding image elements are selected, and the image data thereof are selectively read out. This can be done for example by lines of the detectors used being selectively read. In particular, such detector lines that represent an image line can be read (see above for definition of terms).

In a next step, the selected image data of the first and second image directions of the image can be evaluated and computed jointly to form a three-dimensionally resolved resulting image.

The method can be carried out using a device in which the image elements correspond to the pixels or respectively the detector elements. The first image direction can correspond to the first line direction, while the second image direction can correspond to the second line direction.

In an implementation, the captured image data of both detectors are computed with one another in order to obtain a three-dimensionally resolved resulting image. In this case, it is possible, for example, to compute image data captured in the first and second detection paths for each detector to form a three-dimensionally resolved image and subsequently to combine the three-dimensionally resolved images to form a resulting image, or the captured image data of both detectors are computed to form a three-dimensionally resolved resulting image.

The detector lines that are selectively read need not be situated in the center of the relevant detector or the detector area thereof (chip). Advantageously, however, they can be adjacent to one another. A selection of other detector lines makes it possible to capture image data at a different angle, which may be advantageous in instances where structures are covered.

In further embodiments of the method, the computation of the captured image data and/or the combination of the image data or of the images to form a resulting image can be performed with application of machine learning, in particular, with application of convolutional neural networks (CNN).

In the case where the network has many layers, this is also referred to as deep CNNs. These algorithms are used, for example, to achieve a virtual increase in the resolution for traditionally recorded images. For this purpose, the network is trained with high-resolution data of the type of the corresponding object. Afterward, the trained CNN can calculate a virtual high resolution even from data whose resolution is not as good (e.g., Wang, H. et al., 2018; Nature Methods 16: 103-110). A comparison of various algorithms is found in Zhang, H. et al., 2019; Sensors 19: 3234.

The algorithms provided for use are trained in such a way that they can be used for improving the resolution of the recorded image data. If brain tissue is intended to be imaged, for example, the network is trained with sufficiently many image data of brain tissues. As a result, it is possible to bring about an improvement of the image quality in both detection paths of the specified device.

It is advantageous that different microscope objectives can be used without the arrangement of the device having to be altered. This is accomplished particularly if the pupil size is of approximately the same magnitude. It is advantageously possible to use such objectives which have an identical M/NA ratio (e.g., 40×/1.2 NA; 20×/0.6 NA, 10×/0.3 NA). It is thus possible to observe volumes of different sizes with, in each case, a somewhat different resolution.

The computation of the image data of recordings can be performed with different magnification ratios. To that end, a smaller volume captured with a higher resolution is embedded in a large volume captured with a somewhat lower resolution.

For the provision of the illumination, it is possible to use a laser scanning microscope (LSM), for example, in the form of an additional module. High-resolution image data captured by way of an LSM mode can be combined for example with lower-resolution image data of a 3D measurement. For this purpose, the LSM can be set in an optionally selectable operating mode in such a way that a light sheet generation is made possible. This can be achieved for example by the laser beam being focused into the entrance pupil of the micro-objective.

Accordingly, a combination of the capture according to light field technology with structured illumination microscopy (SIM) is also possible.

In further embodiments, the captured and/or computed image data can be combined with measurement data of an LSM or else of other imaging microscopy methods (e.g., phase contrast; differential interference contrast; structured illumination microscopy, etc.).

If machine learning is used, this can bring about an improvement in the image resolution on the basis of a correspondingly trained CNN. The CNN can be continually adapted and improved using an image-to-image correspondence between the two detection paths.

Further improvements in the image quality can be achieved by incorporating for example data of a three-dimensionally recorded image stack into the CNN training process or in some other procedure of image fusion. The data can be obtained and provided for example by means of a laser scanning microscope operated simultaneously. Implementations additionally allow optical manipulations in 2D and 3D (e.g., holographically). Moreover, it is possible to carry out an evaluation of the measurements in the sense of dSTORM, PALM etc.

Advantages reside in a good to very good spatial resolution and a very good temporal resolution as a result of high parallelization of the voxel capture. A great suppression of the background and/or a high axial resolution can be achieved in the case of illumination with a light sheet. Implementations can be implemented on an existing microscope and, in this case, the numerical aperture of the microscope objective is fully usable. After a computation of the image data, an axial resolution can be achieved which is only slightly diminished in comparison with the depth of field of the objective with a full numerical aperture. Implementations are suitable for use on living samples, for example, on account of the low loading for the sample and rapid three-dimensional imaging.

By means of the device according to implementations disclosed herein, three-dimensional regions of a sample can be simultaneously captured with a temporal resolution in the sub-milliseconds to seconds range with at the same time a sufficient spatial resolution of approximately 1-3 μm. Moreover, disturbing background signals are effectively suppressed, such that a high sensitivity is achieved during the imaging of the observed regions of the sample. In the 3D sample, the intention is thus ultimately for as many voxels as possible to be recorded simultaneously with the highest possible temporal resolution. The method proposed here allows this and offers a very highly parallelized imaging of three-dimensional volumes. Moreover, different microscope objectives can be used without the device having to be altered to a greater extent in this case. This applies particularly if the pupil size is of approximately the same magnitude.

Implementations allow, in particular, observations of objects of an order of magnitude of approximately 0.005 mm to approximately 3 mm (e.g., down to a size of dendrites). The temporal resolution is approximately 0.01 to 1 second, but in specific cases can also be 0.001 to 100 seconds or beyond that.

A specific volume can be captured simultaneously by means of the method and the device disclosed herein. In this case, the full numerical aperture of the detection objective can be used, without a Scheimpflug geometry being required.

The solution proposed here constitutes an extremely suitable compromise for practical use and allows firstly an imaging with a high optical resolution and secondly a very high volume imaging rate. What is notable, in particular, is the flexibility in the adaptation of the operating mode to the measurement task and to the respective sample by virtue of the fact that a corresponding software adjustment is possible in the control.

BRIEF DESCRIPTION OF THE DRAWINGS

The invention is described in more detail below on the basis of exemplary embodiments and figures. In the figures:

FIG. 2 shows a schematic illustration of a microlens array, of a detector and of a readout unit;

FIGS. 3a and 3b show schematic illustrations of a first detector (FIG. 3a) and of a second detector (FIG. 3b);

DETAILED DESCRIPTION

Figure 4C:
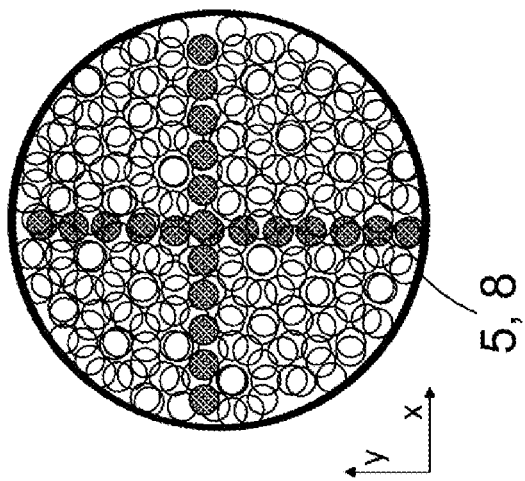
FIGS. 4a to 4c show schematic illustrations of a first exemplary embodiment of a first microlens array (FIG. 4a); of a second microlens array (FIG. 4b) and of a virtual superposition of both microlens arrays (FIG. 4c), both microlens arrays in a first embodiment.
Figure 4B:
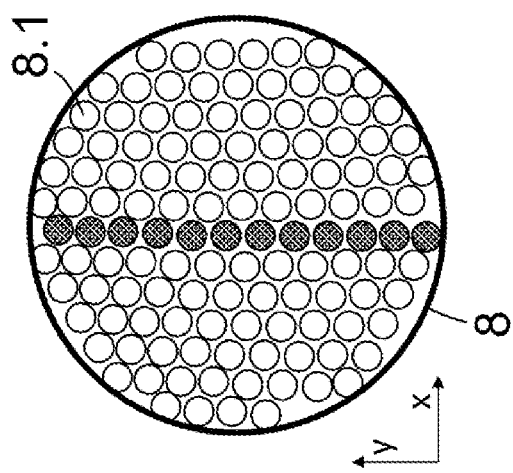
Figure 4A:
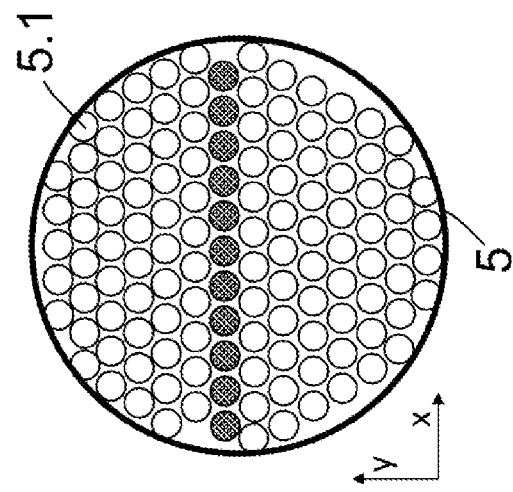
Figure 5C:
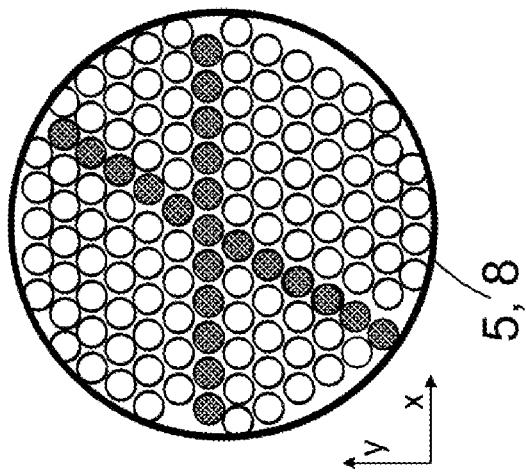
FIGS. 5a to 5c show schematic illustrations of a second exemplary embodiment of a first microlens array (FIG. 5a); of a second microlens array (FIG. 5b) and of a virtual superposition of both microlens arrays (FIG. 5c), both microlens arrays in a first embodiment.
Figure 5B:
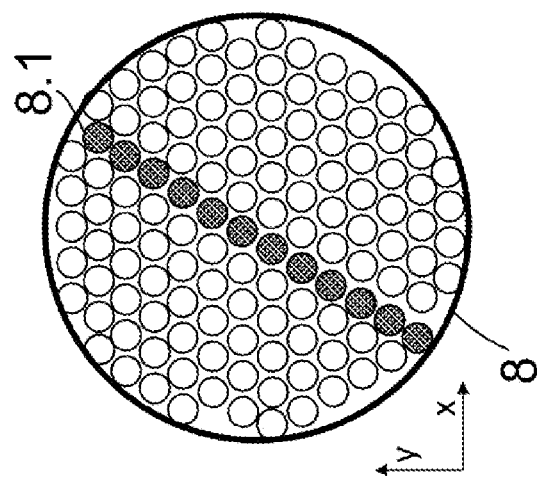

A general set-up of a device 1 according to an implementation has, along a beam path, a means 2 for splitting detection radiation in the form of a beam splitter (beam splitter 2), the effect of which is to split detection radiation DS between a first detection path 3 having a first detector 4 and, disposed upstream thereof, a first microlens array 5 having microlenses 5.1 (shown in an intimated way; see also FIGS. 4a and 5a) and also a second detection path 6 having a second detector 7 and, disposed upstream thereof, a second microlens array 8 having microlenses 8.1 (shown in an intimated manner; see also FIGS. 4b and 5b). The microlens arrays 5 and 8 are each arranged in a pupil. If optical lenses 9 are specified in the exemplary embodiments, they optionally also stand for corresponding combinations of optical elements (lens systems). As a result of the effect of the microlenses 5.1 and 8.1, the detection radiation is imaged onto the detectors 4 and 7, respectively, which are arranged in each case in an image plane BE.

The first detector 4 and the second detector 7 are identical with regard to their spatial and temporal resolution. With regard to the line directions Z1, Z2 of the detector lines DZ of the first detector 4 and the second detector 7, these are inclined in relation to one another, as is illustrated by way of example in FIGS. 3a and 3b. In a simple case where the alignment of an image to be captured is not rotated relative to one another in the detection paths 3 and 6, respectively, the inclined line directions Z1, Z2 can be effected for example by means of an installation position of the detectors 4 and 7 rotated by 90° in relation to one another (in this respect, see also FIGS. 3a and 3b).

A detection radiation DS that comes from a microscope 11 and is focused by the effect of a tube lens 9TL passes through an optional field stop 14 in an intermediate image plane, passes to an optical lens 9 and is split by the effect of the beam splitter 2 between the first detection path 3 and the second detection path 6 for example in a ratio of 50/50. The imaging of the pupil plane of the microscope 11, in particular of a pupil plane (back focal plane) of the microscope objective 18 (see e.g., FIG. 7), into the planes of the microlens arrays 5, 8 is effected via the lens system 9TL, 9. The lens 9TL functions as a tube lens, while the downstream lens 9 acts as a Fourier lens, i.e., brings about a Fourier transformation of the detection radiation. Tube lens and Fourier lens thus constitute an imaging system from the pupil plane of the microscope objective 18 to the microlens arrays 5, 8.

The microlens arrays 5 and 8 are configured identically in one exemplary embodiment. In further possible embodiments, the microlens arrays 5 and 8 can be configured differently in order to be coordinated with the detectors 4, 7 used, for example.

The image data captured by the detectors 4, 7 are selectively read out by a readout unit 10.1 and are fed to an evaluation unit 10.2 in the form of a computer or an FPGA, for example. The readout unit 10.1 can likewise be configured as a computer or an FPGA. Both readout unit 10.1 and evaluation unit 10.2 can be compartments of a computer or an FPGA, for which reason both are put in a common framework, for example. The evaluation unit 10.2 is configured in such a way that the captured and selectively selected image data are evaluated taking account of items of location information, items of angle information and intensity values and, for example, the captured portions of the items of angle information of both detectors 4, 7 are combined, in particular computed, as image data to form a three-dimensionally resolved resulting image. The readout unit 10.1 is configured in such a way that, by means of this readout unit, detector lines DZ (see FIG. 2) are selectively read and forwarded to the evaluation unit 10.2. It can be controlled by the control unit 12, for example, to specify the detector lines DZ that are currently to be selectively read.

The evaluation unit 10.2 is optionally connected to a display 13, for example, a monitor, on which the image data and/or the resulting image or a resulting image stack can be represented. Moreover, the evaluation unit 10.2 is optionally connected to a control unit 12, which can be, in particular, part of the microscope 11. In further possible embodiments, the control unit 12 is not an integral part of the microscope 11, but can be connected to the latter in a manner suitable for transmitting data (see e.g. schematically in FIG. 7).

The control unit 12 is configured for generating control signals on the basis of results of the evaluation unit 10.2. Said control signals can serve for controlling functions of the microscope 11.

FIG. 2 uses the example of the first microlens array 5 and the first detector 4 to elucidate the interaction of both technical elements. The detector 4 has a multiplicity of detector lines DZ, only some of which are illustrated by way of example in a y-direction (second line direction Z2) of an image to be captured. The individual detector lines DZ of the first detector 4 run in an x-direction (first line direction Z1) of an image to be captured and each comprise a number of detector elements 4.1. Fifteen detector elements 4.1 per detector line DZ are shown here merely by way of example. The image data captured by means of the detector elements 4.1 of a respective detector line DZ are read out line by line by the readout unit 10.1 (symbolized for some detector lines DZ with arrows and connecting lines between detector 4 and readout unit 10.1).

The microlens array 5 disposed upstream of the first detector 4 in a pupil has a number of microlenses 5.1, fifteen of which are shown in three rows each having five microlenses 5.1 merely for illustration. On the basis of a microlens 5.1 of the first row, the illustration shows that the detection radiation DS impinging on the microlenses 5.1, as a result of the effect thereof, is directed for example onto three adjacent detector elements 4.1 of in each case three adjacent detector lines DZ (3×3 array). In the example, the microlens 5.1 is assigned a 3×3 array for reasons of clarity; in the practical implementation, a microlens 5.1 can generate an image of 512×512 pixels, for example, with good resolution. According to the respective relative position of the microlenses 5.1, images of a sample 25 which each represent a somewhat different view of the sample 25 are captured by means of the detector 4. The same correspondingly applies to the second to fifth microlenses 5.1 of the first row (not shown explicitly). Since the detection radiation DS optically captured by a row of microlenses 5.1 is converted into image data as a result by detector elements 4.1 of three detector lines DZ, these three detector lines DZ represent an image line BZ of an image to be captured.

On the basis of corresponding control of the readout unit 10.1 by the control unit 12, the detector lines DZ embodying an image line BZ can be selectively read, which is illustrated by filled-in arrows. In this way, image data of a first line direction Z1 can be read out and made available for evaluation.

The different relative orientations of the detector lines DZ of the first detector 4 and of the second detector 7 are illustrated in FIGS. 3a and 3b. The detector lines DZ of the detectors 4 and 7 are aligned orthogonally with respect to one another in regard to an image to be captured, the image directions of which are specified in each case by means of the axes of the coordinate system. FIG. 3a shows the first detector 4 having detector lines DZ running along the x-axis in the first line direction Z1, while FIG. 3b shows the second detector 7, the detector lines DZ of which run in the direction of the y-axis, that is to say in the second line direction Z2. The image lines BZ (only two being selected here) captured by the two detectors 4, 7 are likewise rotated by 90° in relation to one another.

A first exemplary embodiment of the microlens arrays 5 and 8 is shown in FIGS. 4a and 4b, respectively. The microlenses 5.1 and respectively 8.1 are arranged in a hexagonal grid. In FIG. 4a, a line of microlenses 5.1 running horizontally in the x-direction is highlighted with hatching by way of example. The detection radiation DS impinging on the microlenses 5.1 of the line highlighted with hatching is directed onto detector elements 4.1 of a plurality of detector lines DZ of the first detector 4 (image line BZ), as described with regard to FIG. 4 and FIG. 5a. FIG. 4b shows with hatching a vertical column of microlenses 8.1 in the y-direction. The joint effect of the microlens arrays 5 and 8 is illustrated in FIG. 4c. If the image data captured by means of the detectors 4 and 7 are computed with one another to form a resulting image, an image is obtained as though the image capture had been effected by means of a microlens array in accordance with FIG. 4c. The splitting into two detection paths 3, 6 is necessary, however, on account of the line-by-line arrangement of the detector elements 4.1 and 7.1 and the readout mode thereof in individual detector lines DZ.

Figure 5A:
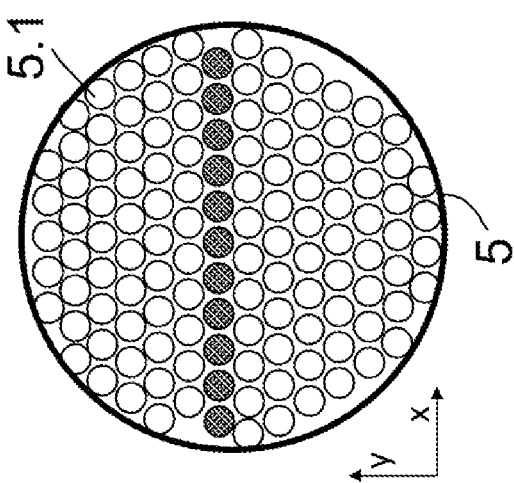

FIGS. 5a and 5b again show microlens arrays 5, 8 in a hexagonal grid. The microlens array 5 has at least one line of microlenses 5.1 (highlighted with hatching) running in an x-direction of the image to be captured (FIG. 5a). The microlenses 5.1 and 8.1 are illustrated as circular in a hexagonal arrangement, but can also be arranged hexagonally and then shaped hexagonally in order to allow small distances between the individual microlenses 5.1 and 8.1, respectively.

The second microlens array 8 corresponds to the first microlens array 5, but now a series of microlenses 8.1 is selected (highlighted with hatching) along a line running at approximately 60° with respect to the x-direction of the image to be captured (FIG. 5b). The detection light DS impinging on the microlenses 8.1 of the line highlighted with hatching is correspondingly directed onto detector elements 7.1 (image line BZ) running in a manner inclined by 60° with respect to the direction of the x-axis (second line direction Z2) (see FIG. 5b). The associated second detector 7 is correspondingly also rotated by 60° in order that its detector lines DZ (second line direction Z2) corresponds to the course of the microlenses 8.1 (not shown).

The joint effect of the microlens arrays 5 and 8 is illustrated in FIG. 5c. If the image data captured by means of the detectors 4 and 7 are computed with one another to form a resulting image, an image is obtained as though the image capture had been effected by means of a microlens array in accordance with FIG. 5c. It is evident from FIGS. 4a to 5c for example that the selected microlenses, and thus also the correspondingly optically assigned detector elements 5.1 and 8.1, respectively, can also run outside the center of the microlens array 5 and 8, respectively, or of the detectors 4 and 7.

If such detectors 4, 7 are available whose detector elements 4.1, 7.1 are selectively and individually readable, it is possible to use an arrangement of microlenses 5.1, 8.1 in accordance with the hatching in FIG. 5c in only one detection path 3 or 6. Alternatively, a detector 4, 7 having detector lines DZ optionally inclined with respect to one another can be used individually. What is important, however, is that these regions can be read at high speed. Technological approaches for this are known in the case of EMCCDs, for example, in which different sensor regions can be read basically in parallel.

Figure 6:
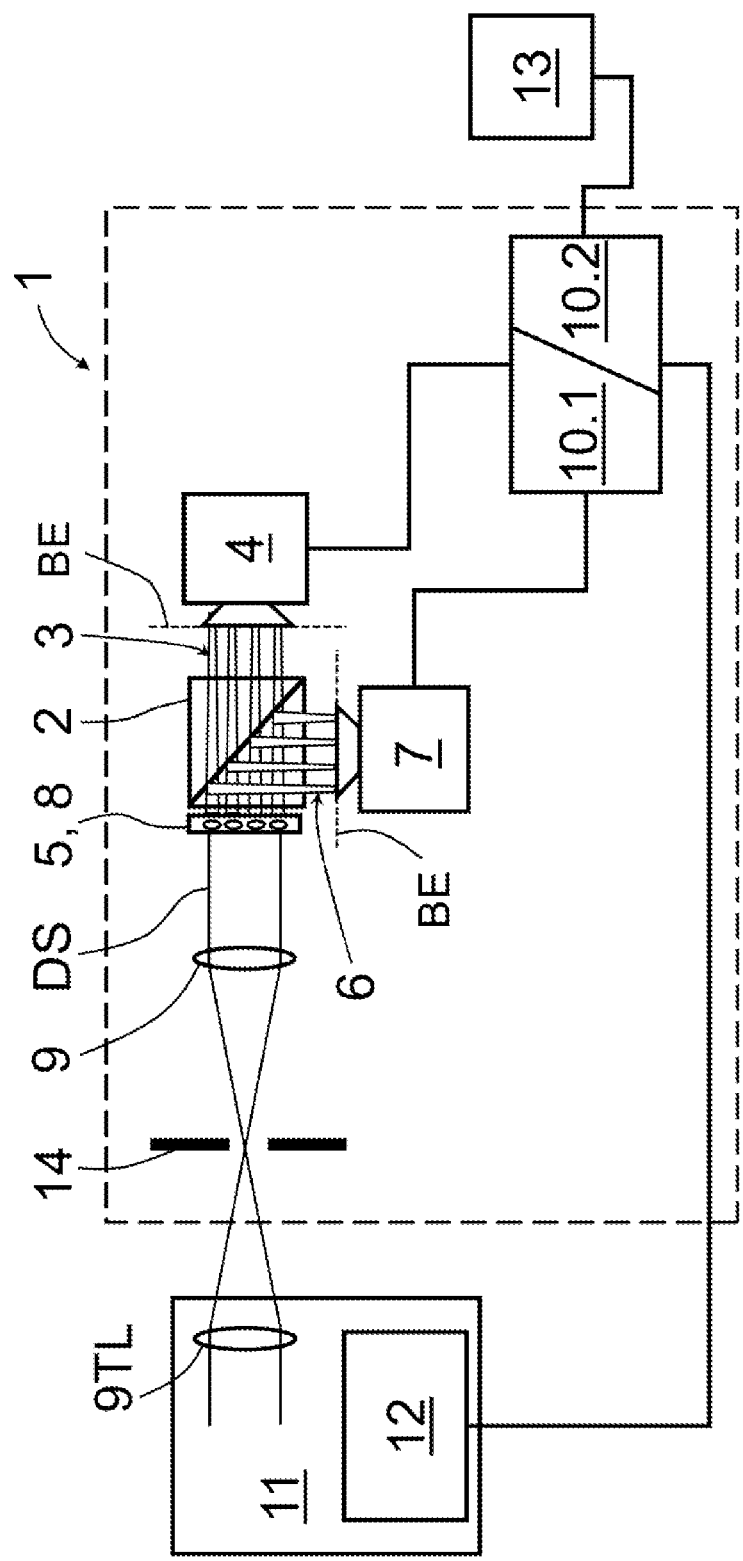
FIG. 6 shows a schematic illustration of a second exemplary embodiment of a device according to an implementation as part of a microscope.

A device 1 according to an implementation in a microscope 11 having a stationary common microlens array 5, 8 is shown in FIG. 6. The common microlens array 5, 8 is preferably arranged in a pupil of the detection beam path. The detection radiation DS that has passed through the common microlens array 5, 8 is split by means of the beam splitter 2 between the first detection path 3 and the second detection path 6 and is captured there in each case by the present first detector 4 and the second detector 7, respectively. With regard to the detectors 4, 7, the common microlens array 5, 8 is once again disposed optically upstream in a pupil, such that the image data are captured according to the principle of Fourier domain light field microscopy.

The common microlens array 5, 8 has at least one respective series of microlenses 5.1, 8.1 in a first direction and in a second direction. The detector lines DZ in each case to be detected of the detectors 4 and 7, respectively, as explained with regard to FIGS. 4a to 4c and 5a to 5c, can be selected by means of a corresponding alignment of the detector lines DZ of detectors 4 and 7, without the common microlens array 5, 8 actually being rotated.

In a third exemplary embodiment of the device 1 in a microscope 11 (FIG. 7), there are present in an excitation beam path a light source 15 for providing an illumination light, which can advantageously be laser light, as excitation light, optical lenses 9, a light-directing unit 17 or scanning device 17, a color splitter 16 and an objective 18 with an entrance pupil EP, said objective functioning as an illumination objective. The light source 15, in particular, in the form of a laser light source, can optionally be operated in a pulsed manner.

In a detection beam path (symbolized by interrupted solid lines) there are arranged an optical lens 9 and the beam splitter 2, by means of which detection radiation DS is directed along the first detection path 3 with the first microlens array 5 and the first detector 4 and/or along the second detection path 6 with the second microlens array 8 and the second detector 7. The detectors 4 and 7 are connected to the readout unit 10.1 and to the evaluation unit 10.2 and the latter to the control unit 12 in a manner suitable for exchanging data. By means of the control unit 12, it is possible to generate control commands that serve for controlling the scanning device 17 (henceforth also: scanner 17). In further embodiments, the light source 15 can also be controlled by the control unit 12 (symbolized by an interrupted solid line).

During the operation of the microscope 11 comprising the device 1, laser light emitted by the laser light source 15 is focused and passes to the scanning device 17. The scanning device 17, which is controlled by the control unit 12, deflects the laser light in a controlled manner in an x-direction x and/or in a y-direction y. The scanning device 17 can be used to vary the angle of incidence of the excitation light in the entrance pupil EP (objective pupil).

The excitation light, after passing through the dichroic color splitter 16, is directed into an entrance location in the entrance pupil EP that lies away from the optical axis oA of the objective 18. As a result, a light sheet 19 which is inclined with respect to the optical axis oA in a correspondingly inclined light sheet plane is generated on the object side by way of the objective 18. If a sample 25 is located in a sample space 20 in front of the objective 18, the light sheet 19 can be directed into said sample.

The excitation beam path (=illumination beam path) can include optionally adjustable optical means 21 such as a zoom optical unit or a stop, for example, the effect of which is that a thickness of the light sheet 19 transversely with respect to the light sheet plane is adjustable (only shown in an intimated manner). The adjustable optical means 21 can be controlled by means of the control unit 12.

By means of the effect of the light sheet 19 formed from the excitation light, fluorescence can be excited in the sample 25 and be emitted as detection light (detection radiation). Emitted detection light is collected by the objective 18, which serves both as the illumination objective and as the detection objective. In the color splitter 16, the detection radiation DS having a longer wavelength than the excitation light is reflected into the further course of the detection beam path and passes via the beam splitter 2 to the first microlens array 5 and/or the second microlens array 8. The microlenses, shown in an intimated manner, can be regarded as individual imaging systems. The images brought about by the individual microlenses are captured as image data by correspondingly positioned detector elements of the detectors 4 and 7, respectively, are selectively read out by means of the readout unit 10.1 and are forwarded to the evaluation unit 10.2.

In the illumination beam path, a further dichroic beam splitter 22 is arranged between the light source 15 and the scanning device 17. As a result of the effect of said beam splitter, detection radiation DS which, coming from the sample space 20, has passed through the beam splitter 16 and the subsequent optical elements and has been converted into a stationary beam (descanned) as a result of the effect of the scanning device 17 is directed into the last section of a third detection path 23. In this exemplary embodiment, the beam splitter 16 functions (also) for splitting the captured detection radiation between the first and second detection paths 3, 6 or respectively the third detection path and can be dichroic or split detection radiation DS in a specific ratio. The detection radiation DS is focused into an intermediate image plane ZB by means of an optical lens 9, a pinhole 24 in the form of a pinhole stop or a slit stop being situated in said plane. As a result of the effect of the pinhole 24, those portions which originate from out-of-focus regions are removed from the beam of the detection radiation DS or at least largely reduced. By way of example, a secondary electron multiplier (photomultiplier tube, PMT), an array of a plurality of PMTs or a two-dimensional detector (see above) can be used as third detector 26. The third detector 26 is connected to the evaluation unit 10.2. The latter is in turn connected to the scanning device 17 in order to obtain data concerning a respective current alignment of the scanning device 17. On the basis of the current alignment, a position in an X-Y-plane can be assigned to the individual image data captured by means of the third detector 26. Information concerning the axial position (position in the z-direction, Z-position) can be determined on the basis of the known position of the current focal plane of the objective 18 and optionally taking account of a point spread function (PSF) that is known for the image capture system. Image data can be captured at different z-positions (z-stack). In this way, three-dimensionally resolved image data can be captured by the third detector 26. Owing to the configuration of the third detection path 23 as a confocal detection path, a higher spatial resolution by comparison with the first detector 4 and the second detector 7 is achieved. If switching is effected alternately between capture by means of the third detection path 23 (confocal) and the first and second detection paths 3, 6, the adjustable optical means 21 can accordingly be controlled to generate either an illumination light spot or a light sheet 19.

In further embodiments, the beam splitter 16 can be replaced by a switchable mirror, for example. The image data captured by means of the first detector 4 and/or the second detector 7 are combined with image data of the third detector 26 by the evaluation unit 10.2 and a three-dimensional resulting image is calculated.

Figure 1:
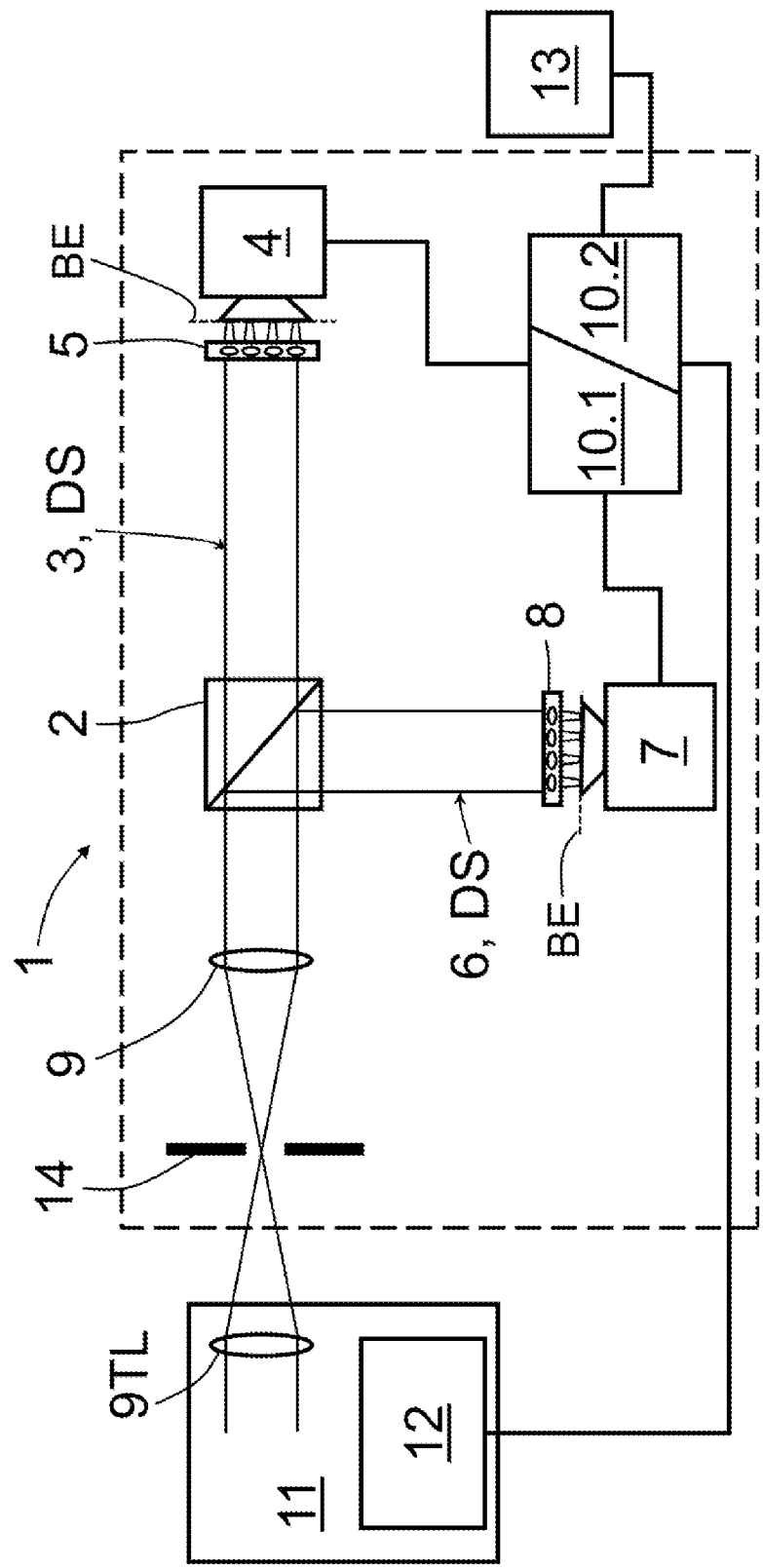
FIG. 1 shows a schematic illustration of a first exemplary embodiment of a device according to an implementation as a part of a microscope.
Figure 7:
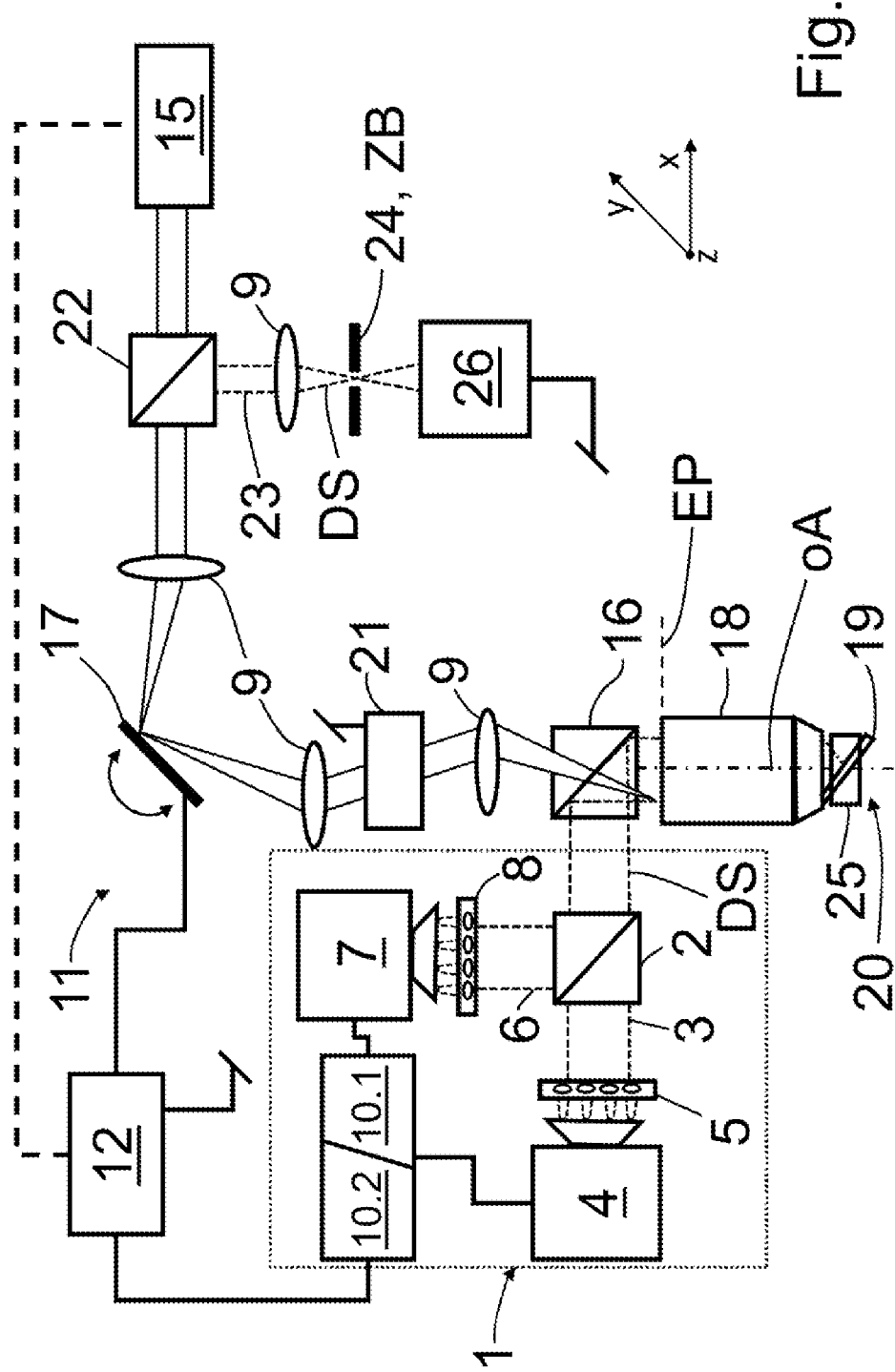
FIG. 7 shows a schematic illustration of a third exemplary embodiment of a microscope comprising a device according to an implementation comprising means for generating a light sheet, detection paths for light field microscopy, and comprising a confocal detection path.

The exemplary embodiments illustrated in FIGS. 1, 6 and 7 can be used for example for two-channel light field microscopy. Spectral components of the detection radiation can be separated by means of the beam splitter 2.

Figure 8:
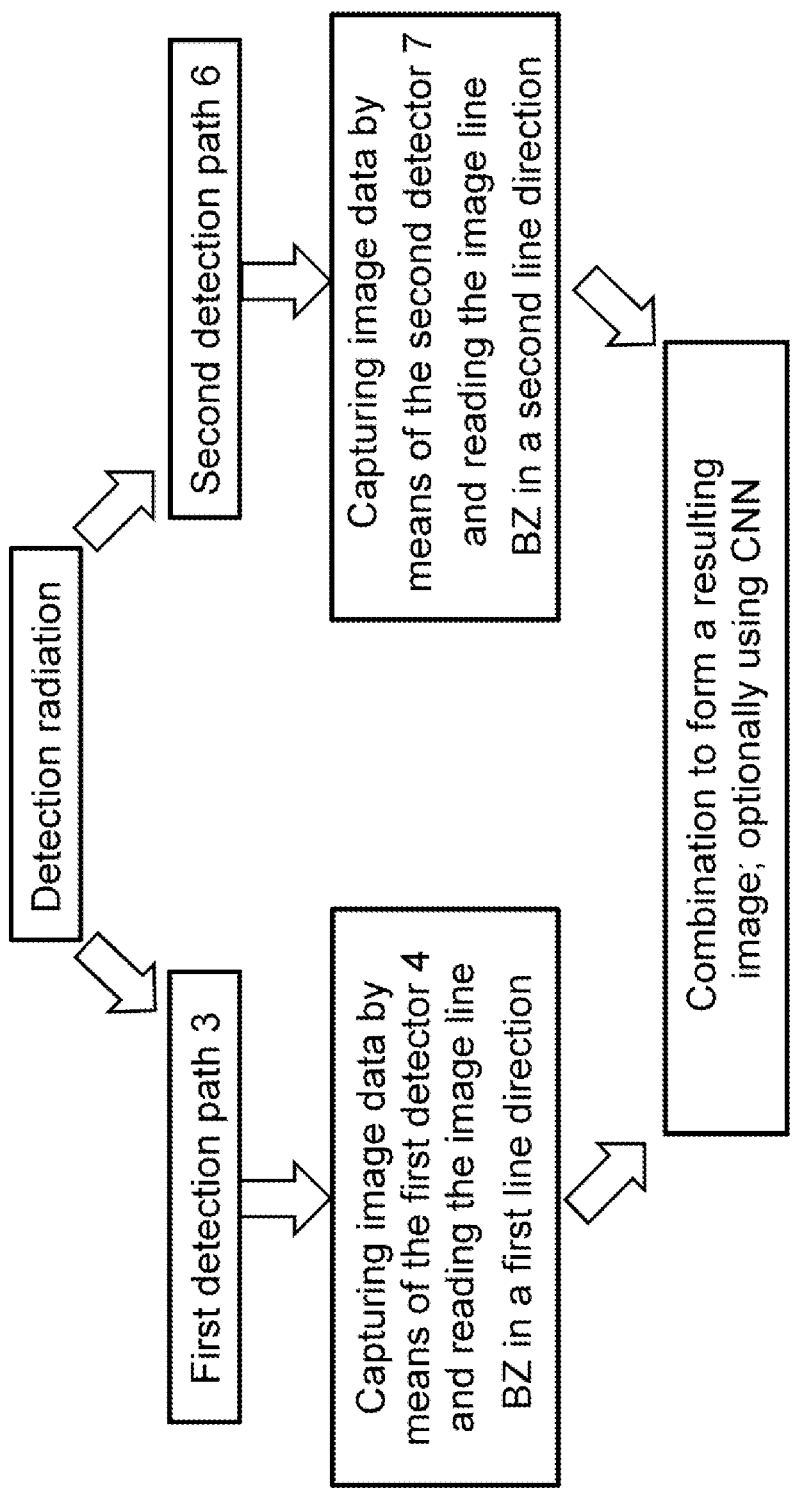
FIG. 8 shows a flowchart of a method according to an implementation.

A method according to an implementation is shown in summary in FIG. 8. The detection radiation is directed into the first and/or the second detection path 3, 6 and is captured there by means of the detector 4, 7 respectively present for example in accordance with the principle of light field technology. The captured image data of the detectors 4 and 7 are combined to form a resulting three-dimensionally resolved image. The figure does not show a corresponding extension by a third detection path 23, as described with regard to FIG. 7.

In further embodiments of the method, the image data captured by means of the first detector 4 and the second detector 7 or respectively images calculated therefrom can be mapped to one another using a CNN (Convolutional Neural Network) and a three-dimensionally resolved resulting image can be calculated.

LIST OF REFERENCE SIGNS

1 Device
2 Means for splitting (the detection radiation; beam splitter)
3 First detection path
4 First detector
4.1 Detector elements, pixels, image elements (of the first detector 4)
5 First microlens array
5.1 Microlens
6 Second detection path
7 Second detector
7.1 Detector elements, pixels, image elements (of the second detector 7)
8 Second microlens array
8.1 Microlens
9 Optical lens
10.1 Readout unit
10.2 Evaluation unit
11 Microscope
12 Control unit
13 Display
14 Field stop
16 Color splitter
15 Light source
17 Scanning device
18 Objective
19 Light sheet
20 Sample space
21 Adjustable optical means
22 Beam splitter (for confocal beam path)
23 Third detection path
24 Pinhole
25 Sample
26 Third detector
BE Image plane
BZ Image line
DZ Detector line, line
DS Detection radiation
EP Entrance pupil
oA Optical axis
Z1 First line direction
Z2 Second line direction

The invention claimed is:

1. A device for capturing image data comprising:
a means for splitting a detection radiation between a first detection path and a second detection path, wherein detection radiation is guided or is guidable along the first and second detection paths;
a first detector in the first detection path, wherein the first detector includes detector elements that are arranged in an image plane and are arranged in detector lines in a first line direction;
a second detector in the second detection path, wherein the second detector includes detector elements that are arranged in an image plane and are arranged in detector lines in a second line direction, the second line direction being different than the first line direction;
a microlens array disposed upstream of both the first and second detectors in a plane that is conjugate with respect to a system pupil, wherein each microlens of the microlens array is optically assigned in each case a number of detector elements, such that an image line of the first and respectively of the second detector are formed by those detector elements of at least one detector line which are optically assigned to microlenses of the microlens array; and
a readout unit configured for reading out the image data of the detectors, wherein the readout unit is configured for selectively reading those detector elements arranged line by line which form an image line.

2. The device of claim 1, wherein the first detector and the second detector are arranged relative to an image to be captured in such a way that the first line direction and the second line direction are inclined in relation to one another.

3. The device of claim 1, further comprising an evaluation unit configured for evaluating the captured image data of the first and second detectors, wherein the evaluation unit is configured in such a way that the selectively read-out image data of both detectors are evaluated and a three-dimensionally resolved resulting image is generated from the evaluated image data.

4. The device of claim 1, wherein the first detector and the second detector have a substantially identical spatial and temporal resolution and the detectors are configured for capturing a same image of a sample.

5. The device of claim 1, wherein the means for splitting the detection radiation includes at least one of a beam splitter, a dichroic beam splitter, a polarization splitter, a spatially structured beam splitter, a diffractive element, or a switchable mirror.

6. The device of claim 1, wherein the mircolens array includes a common microlens array disposed upstream of the two detectors in a plane that is conjugate with respect to the system pupil.

7. A microscope comprising:
- a light source configured for providing excitation light to a sample;
- a means for splitting detection radiation emitted from the sample in response to the excitation light provided to the sample between a first detection path and a second detection path, wherein the detection radiation is guided or is guidable along the first and second detection paths;
- a first detector in the first detection path, wherein the first detector includes detector elements that are arranged in an image plane and are arranged in detector lines in a first line direction;
- a second detector in the second detection path, wherein the second detector includes detector elements that are arranged in an image plane and are arranged in detector lines in a second line direction, the second line direction being different than the first line direction;
- a microlens array disposed upstream of both the first and second detectors in a plane that is conjugate with respect to a system pupil, wherein each microlens of the microlens array is optically assigned in each case a number of detector elements, such that an image line of the first and respectively of the second detector are formed by those detector elements of at least one detector line which are optically assigned to microlenses of the microlens array; and
- a readout unit configured for reading out image data of the detectors, wherein the readout unit is configured for selectively reading those detector elements arranged line by line which form an image line.

8. The microscope of claim 7, wherein the light source is configured for providing pulsed illumination light.

9. The microscope of claim 7, wherein the light source includes a laser light source, and further comprising an objective functioning as an illumination objective disposed in an illumination beam path of the mircroscope, wherein the light source and the objective are configured for generating a wide field illumination.

10. The microscope of claim 9, further comprising a device for generating a light sheet on an object side in front of the objective in a sample space, wherein the light source, the objective, and the device for generating a light sheet are present in the illumination beam path.

11. The microscope of claim 10, wherein the device for generating a light sheet includes a cylindrical optical unit and/or a scanning device, wherein an illumination light beam of the light source that is shaped by the cylindrical optical unit and/or respectively an illumination light beam of said light source that is deflected by means of the scanning device is directed into an entrance location in an objective pupil of the objective, said entrance location lying away from an optical axis of the objective.

12. The microscope of claim 10, further comprising an adjustable optical means in the illumination beam path, wherein a thickness of the light sheet transversely with respect to a light sheet plane is adjustable by way of the optical means.

13. The microscope of claim 11, wherein the scanning device is configured for descanning detection radiation and guiding the descanned detection radiation into a third detection path, wherein the third detection path includes a confocal stop in an intermediate image plane.

14. A method for capturing image data, the method comprising:
- splitting detection radiation of a microscope between a first detection path and a second detection path;
- capturing an item of location information of an origin of the detection radiation;
- capturing a plurality of items of angle information of the detection radiation in each of the first and second detection paths in an image plane;
- capturing, in the first detection path and in the second detection path, image data of a same image with a substantially identical spatial and temporal resolution, wherein the image data represent selected detector elements, of which image data representing a plurality of detector elements in a first image direction are captured in the first detection path and image data representing a plurality of detector elements in a second image direction are captured in the second detection path, wherein the second image direction is different from the first image direction; and
- selectively reading out the captured image data of corresponding detector elements by lines of the detector elements.

15. The method of claim 14, further comprising:
jointly computing the selected image data of the first and second image directions to form a three-dimensionally resolved resulting image.

16. The method of claim 15, further comprising:
capturing image data by a high-resolution, image capture method; and
using the image data captured by the high-resolution, image capture method along with the selected image data of the first and second image directions to generate the three-dimensionally resolved resulting image.

17. The method of claim 15, wherein computation of the image data to form the resulting image is performed with application of a Convolutional Neural Network.

* * * * *

UNITED STATES PATENT AND TRADEMARK OFFICE
CERTIFICATE OF CORRECTION

PATENT NO. : 12,001,006 B2
APPLICATION NO. : 17/453079
DATED : June 4, 2024
INVENTOR(S) : Anhut et al.

It is certified that error appears in the above-identified patent and that said Letters Patent is hereby corrected as shown below:

In the Claims

In Column 19, Claim 9, Line 55, delete "mircroscope," and insert -- microscope, --, therefor.

Signed and Sealed this
Tenth Day of December, 2024

Katherine Kelly Vidal
*Director of the United States Patent and Trademark Office*